3,273,713
REMOVAL OF FLUORINE COMPOUNDS FROM
PHOSPHORIC ACID
William R. Parish, Gretna, La., assignor to Swift & Company, Chicago, Ill., a corporation of Illinois
Filed Apr. 9, 1963, Ser. No. 271,718
7 Claims. (Cl. 23—153)

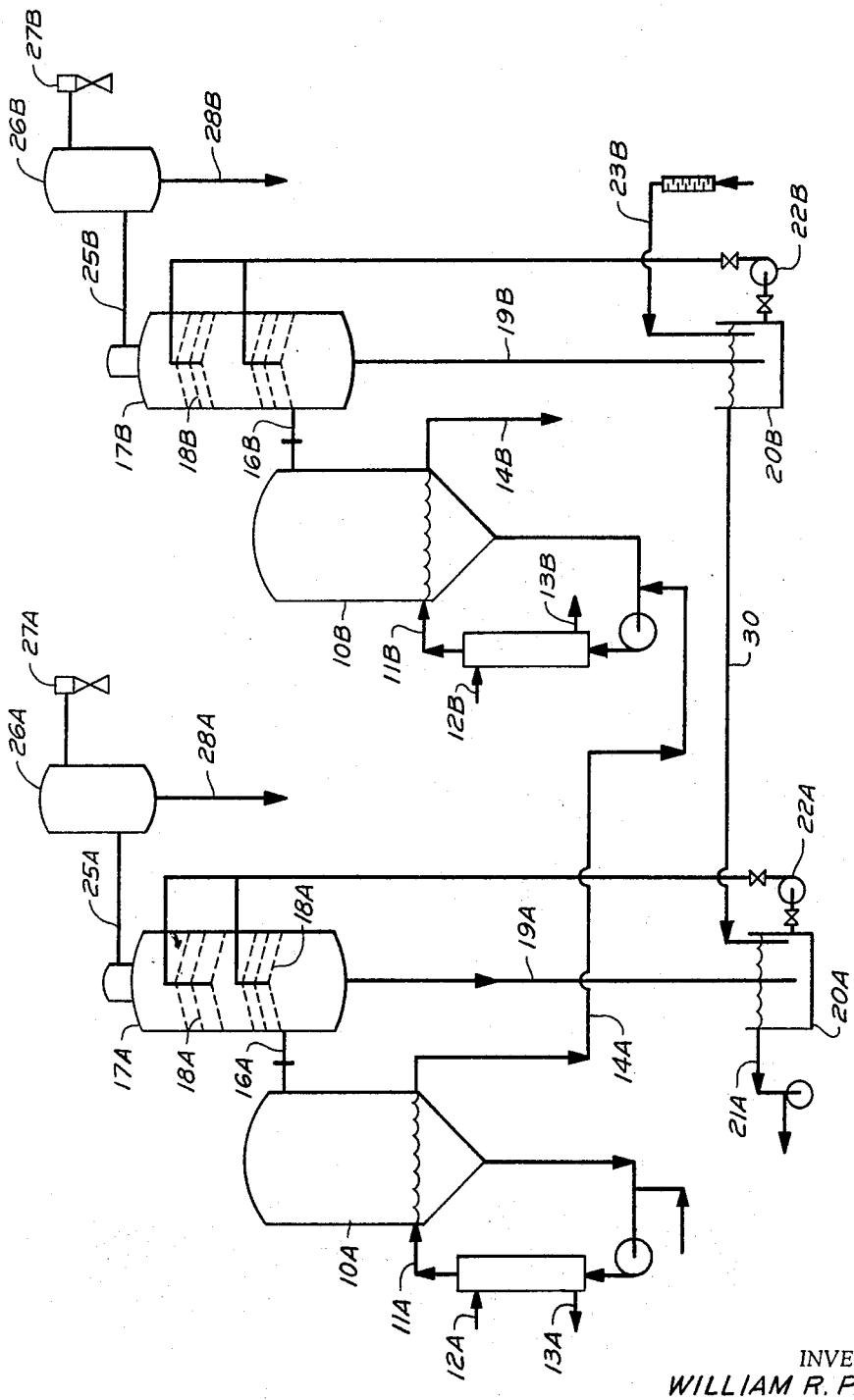

This application is a continuation-in-part of U.S. Serial No. 46,770, filed August 1, 1960, and now U.S. Patent No. 3,091,513.

This invention relates to the removal and to the recovery of fluorine compounds from solutions containing said fluorine compounds. More particularly, the invention concerns a method of recovering fluorine compounds in a commercially salable form from vapors containing fluorine compounds in the gaseous phase. A specific embodiment comprises recovering gaseous fluorine compounds produced in the concentration of "wet-process" phosphoric acid while avoiding the precipitation of silica.

The "wet-process" method for producing phosphoric acid involves the acidulation of phosphate rock with an inorganic acid such as sulfuric acid. In this process, phosphate rock is ground and premixed with weak phosphoric acid to form a slurry. This slurry is introduced into a reactor, sulfuric acid is added, the entire system agitated, and cooled with large volumes of air or by vacuum-cooling. The slurry is pumped to filters, where phosphoric acid of about 25–33% $P_2O_5$ is separated from the calcium sulfate precipitate which has formed. The calcium sulfate filter cake is washed with dilute phosphoric acid which, along with part of the filtrate, is returned to the head of the system for use in preslurrying the ground phosphate rock. Then the calcium sulfate is further washed with fresh water.

Phosphoric acid produced by the "wet-process" method contains about 25–33% $P_2O_5$. This acid is usually concentrated to about 54% $P_2O_5$; however, there are times when a concentration of about 40–50% $P_2O_5$ or 55–75% $P_2O_5$ is desirable. For example, a concentration of 70% $P_2O_5$ acid is desirable when the acid is to be used for the manufacture of non-sludging ammonium phosphate solution utilized in liquid fertilizers or where freight is a consideration in shipment. In addition, two or more evaporation stages are often employed for reasons of heat and equipment economy.

Almost all phosphate rocks contain fluorine compounds in amounts varying between about 0.06 and 0.20 part of fluorine per part of $P_2O_5$. During acidulation of the phosphate rock, the fluorine compounds have a variable distribution, i.e., some fluorine is volatilized, some goes into the calcium sulfate, while the majority goes into the dilute phosphoric acid. During concentration of the dilute phosphoric acid, the fluorine compounds are volatilized mainly in the form of $SiF_4$ and HF, along with water vapor.

The removal of fluorine compounds from phosphoric acid solutions by evaporation and a scrubbing liquor at atmospheric conditions and at recoveries sufficient to prevent atmospheric pollution can be accomplished in a single stage, if the concentration in the scrubbing liquor is low (about 2–5% fluorine) so that losses due to equilibrium vapor pressure of the fluorides are small. In addition, atmospheric pollution can be prevented by removing the fluorine compounds in a vacuum system. Concentration of dilute phosphoric acid under vacuum, as previously practiced, involves the condensation of fluorine compounds, along with water vapor, in a barometric condenser. The amount of fluorine in the condensate is so small that the condensate must be evaporated or flashed to increase the concentration of fluorine compounds in the liquid. This second evaporation step renders recovery of the fluorine compounds economically unattractive and, accordingly, it has been the practice to neutralize the fluorine compounds and discharge the dilute solution to waste.

If removal and disposal is all that is involved, the dilute fluorine compounds can be precipitated with a calcium hydroxide slurry and sent to sedimentation waste ponds. On the other hand, if it is desirable to recover the fluorine compounds in a manner which renders the recovery economically attractive, other means must be utilized. An economically attractive method of preventing atmospheric pollution, while at the same time recovering the fluorine compounds in a commercially salable form, is disclosed and claimed in U.S. Patent No. 3,091,513. In general, the method disclosed in that patent comprises removing fluorine compounds from vapors comprising water vapor and fluorine compounds mainly in the form of HF and $SiF_4$ by scrubbing the vapors under vacuum with a fluorine-compound-absorbing liquid at a temperature substantially that of said vapors whereby the fluorine compounds are absorbed in the scrubbing liquor and the condensation of the water vapor is substantially avoided.

As brought out in U.S. Patent No. 3,091,513, it is desirable to keep the concentration of dissolved fluorine compounds in the scrubber liquor below about 28% to obtain good scrubbing efficiency. If the concentration of the fluorine compounds such as fluosilicic acid or its salts in the recycle scrubbing liquor becomes too high, that is, greater than about 28%, the vapor pressure of the fluorine compound in the liquor becomes sufficiently great so that the amount of fluorine removed from the scrubber is diminished. Accordingly, a balance must be maintained between highly concentrated recycle liquor and very dilute recycle liquor so that large volumes of dilute aqueous fluorine-compound-solutions need not be handled and, on the other hand, an excessive amount of fluorine compounds will not be lost to the barometric condenser portion of the apparatus. In general, the concentration of the fluosilicic acid in the scrubbing liquor is maintained between about 13–28%.

If two or more scrubbers and two or more evaporation stages are employed, as suggested in my co-pending application, it was discovered that silica precipitated in the first stage. In the first-stage evaporation, more than ½ mole of $SiF_4$ per mole of HF is evolved. The excess $SiF_4$ evolved hydrolyzes in the scrubber liquid and the precipitate of silica which results necessitates frequent cleaning of lines and equipment.

It is, therefore, an object of this invention to provide a system which will prevent silica precipitation and/or solubilize precipitated silica when phosphoric acid is concentrated in stages.

It is also an object of this invention to recover higher strength fluorine compounds without lowering the overall fluorine removal efficiency.

An additional object of this invention is to provide a process for removing fluorine compounds while producing a highly-concentrated phosphoric acid.

Additional objects, if not specifically set forth herein, will be readily apparent to those skilled in the art from a detailed description of the invention which follows.

Generally, the invention is directed to the vacuum-removal of fluorine compounds from vapors containing compounds of fluorine, together with water vapor. While the process has applicability in various operations where fluorine compounds are volatilized in a vacuum system, along with other vapors, it is particularly valuable in selectively entrapping and recovering fluorine compounds from vapors evolved in the vacuum-concentration of dilute phosphoric acid. The vapors evolved from the concentrator are treated with a scrubbing liquid containing dissolved hydrogen fluoride under conditions of pressure and temperature which ensures substantial absorption of fluorine compounds by the scrubbing liquor while avoiding substantial condensation of water vapor.

More specifically, an embodiment of the invention comprises a process wherein dilute phosphoric acid is evaporated in stages and the gaseous fluorine compounds are contacted with a scrubbing liquor in a plurality of stages. In the production of higher-strength phosphoric acid, two or more evaporation stages are employed and the scrubbing liquor from the second or subsequent stage is transferred to the first-stage seal box.

At this point, it should be noted that the final concentrated phosphoric acid must be over about 44–50% $P_2O_5$, depending upon the impurities present, in order to prevent silica precipitation in the final product if the concept of the instant invention is not utilized. The exact final concentration of the phosphoric acid will vary, but about 50% $P_2O_5$ is the minimum final concentration whereby silica will not precipitate out in the recovered fluosilicic acid product. For example, when evaporating in stages, 32–42% $P_2O_5$ in the first stage and 42–54% $P_2O_5$ in the second stage, silica will precipitate out in the first stage. However, it has now been discovered that by mixing the second-stage product into the first-stage product, one can obtain a clear product with no silica precipitation in either stage. It is toward this concept that the instant invention is mainly directed.

The instant process for the removal of fluorine compounds during the concentration of phosphoric acid is carried out under vacuum. Vacuum-evaporation involves the heating of the dilute acid under a reduced pressure to volatilize water and fluorine compounds. The vapors are conducted through a scrubber and, thence, to a water condenser. Dilute phosphoric acid of about 30% $P_2O_5$ is concentrated in a first-stage evaporator to a concentration of about 42% $P_2O_5$. This 42% $P_2O_5$ acid is then fed to the input of a second-stage evaporator wherein the acid is usually concentrated to about 54% $P_2O_5$. Of course, the acid may be concentrated to a higher percent, if desired, for example, 70% $P_2O_5$.

The vapors produced in the concentration of phosphoric acid comprise water vapor, and fluorine compounds, mainly in the form of $SiF_4$ and $HF$. In general, two moles of evolved $HF$ are required for each mole of evolved $SiF_4$ to produce a stoichiometric amount of $H_2SiF_6$ in the scrubbing liquor. However, in multiple staged evaporation of phosphoric acid wherein the acid is first concentrated to a $P_2O_5$ content of less than about 50%, more than one mole of $SiF_4$ per two moles of $HF$ is evolved. The stoichiometric excess $SiF_4$ hydrolyzes in the scrubber liquor and tends to precipitate silica. The reaction is believed to be as follows:

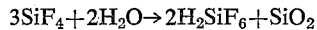
$$3SiF_4 + 2H_2O \rightarrow 2H_2SiF_6 + SiO_2$$

However, in the second stage of evaporation, more than about two moles of $HF$ per mole of $SiF_4$ is evolved and, accordingly, no precipitation of silica is encountered. Since the scrubbing liquor in the second stage is less rich in Si, it is possible, by introducing the second-stage liquor into the first-stage seal box, to prevent silica from precipitating in the first stage. It thus becomes apparent, by mixing the second-stage product into the first-stage product, that one can obtain a clear product with no silica precipitation in either stage. The reaction wherein the silica is solubilized by the hydrogen fluoride is as follows:

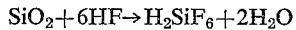
$$SiO_2 + 6HF \rightarrow H_2SiF_6 + 2H_2O$$

When the scrubbing liquor, enriched in HF, from the second-stage seal box is transferred to the first-stage scrubbing liquor (which contains excess $SiF_4$) the hydrogen fluoride reacts with the $SiF_4$ to produce fluosilicic acid according to the following equation:

$$SiF_4 + 2HF \rightarrow H_2SiF_6$$

The instant invention relates mainly to the concept of transferring the second-stage scrubbing liquor, which is enriched in hydrogen fluoride, to the first stage liquor (enriched in $SiF_4$) so that the excess $SiF_4$ will not precipitate out silica. It should be noted, however, that the invention is not so limited and that an outside source of aqueous hydrogen fluoride may be added to the first-stage scrubbing liquor either in place of or in conjunction with the second-stage scrubbing liquor. The important point is that hydrogen fluoride, whether from an outside source or from the second stage scrubbing liquor, must be added to the scrubbing liquor used in the first stage in order to prevent silica precipitation.

In the scrubbers, the vapors are contacted with the scrubbing liquor containing free hydrogen fluoride such as warm water or a warm aqueous solution of fluorine compounds, primarily fluosilicic acid and hydrogen fluoride. Generally, the scrubbing liquor is maintained at a temperature above about 25° C. and usually not in excess of about 95° C., depending upon the amount of vacuum employed. In operation, the first and second stages are operated at different vacuums and temperature ranges due to the difference in $P_2O_5$ content of the acid being concentrated. In any event, the temperature of the scrubbing liquor in each stage will be substantially that of the vapors which are being scrubbed. The temperature of the scrubbing liquor is elevated sufficiently to ensure that no appreciable amount of condensation of water vapor takes place, yet the fluorine compounds in the vapors are sufficiently absorbed. The vacuum employed is usually greater than 5 inches of mercury vacuum. Use of a vacuum in the range of 5–29 inches of mercury vacuum requires the temperature to be about 25–95° C.

Usually, it is advisable to keep the concentration of the dissolved fluorine compounds in the scrubber liquor below about 28% to obtain good scrubbing efficiency if only one scrubbing tower is used in each stage. If the concentration of the fluorine compounds such as fluosilicic acid or its salts in the recycle scrubbing liquor becomes too high, the vapor pressure of the fluorine compounds in the liquor becomes sufficiently great so that the amount of fluorine removed in the scrubber is diminished. Generally, a balance is maintained between highly-concentrated recycle liquor and very dilute liquors so that large volumes of dilute aqueous fluorine-compound-solutions need not be handled and, on the other hand, an excessive amount of fluorine compounds will not be lost in the condenser. In some cases, however, it is desirable, even though fluorine recovery is not as efficient to use as aqueous scrubbing liquor having more than about 25–28% fluosilicic acid. If a highly-concentrated aqueous solution of fluosilicic acid is desired, for example, 35–40% $H_2SiF_6$, it is possible, using the system of this invention, to obtain this high concentration directly without further evaporating the scrubber product. For example, the fluorine recovery may be increased to the 90–95% range by using 2 or more scrubbers in each stage.

The drawing, illustrating a preferred embodiment of the invention, will be employed in connection with the explanation of the invention.

In the drawing, a vacuum-evaporating vessel 10A, being equipped with an entry port 11A for the introduction of dilute (about 26–32% $P_2O_5$) phosphoric acid, a source of heat such as steam which enters conduit 12A, and a steam condenser exit conduit 13A, as well as an acid exit conduit 14A, equipped with a valve (not shown) for transfer of relatively concentrated phosphoric acid, is illustrated. The relatively concentrated phosphoric acid contains a reduced amount of fluorine compounds, has a concentration of about 42% $P_2O_5$ and is transferred to a second evaporator 10B. At the upper end of the concentrator 10A is a conduit 16A, which communicates with a scrubber tower 17A. As volatile fluorine compounds (mainly $SiF_4$), along with water vapor, pass into this tower, the scrubbing liquor is introduced into the tower through nozzles (not shown) in the form of a spray 18A. After absorbing the volatile fluorine material, the scrubbing liquor falls into the barometric leg 19A, which is preferably about 34 feet long, depending upon the amount of vacuum within the scrubber and the specific gravity of the recycle liquor. The end of the barometric leg is immersed in a seal box 20A. The seal box contains a solution of the absorbed fluorine compounds. When the scrubber liquor is a solution of hydrogen fluoride, or aqueous fluosilicic acid and hydrogen fluoride, the fluorine compound product is fluosilicic acid.

The product overflows the seal box and is pumped to storage via line 21A. At the same time, the liquor in the seal box is recycled by means of pump 22A, to the scrubber tower. The temperature of the liquor being recycled through the spray nozzles down through the barometric leg and into the seal box is maintained at a level sufficient to ensure that at the vacuum under which the system is operated, volatile fluorine compounds will be absorbed in the scrubber liquor; yet, no substantial portion of water vapor will be condensed.

An outlet from the scrubber tower comprising a conduit 25A leads into a barometric condenser 26A. The condenser is connected to a suitable source of vacuum such as a vacuum pump 27A. Those gases which have not been condensed or absorbed are exited from the condenser. In the barometric condenser, a spray system (not shown) is provided to condense the water vapors. The temperature and amount of water entering this condenser is maintained at a level sufficient to ensure that water vapor is condensed and passes down through line 28A into a seal box (not shown). The condensate is permitted to overflow and is sent to waste. This condensate contains only a very small portion of fluorine compounds.

Since the operation of the second or subsequent stage is similar to the first stage, a detailed discussion of the second stage of operation will be omitted. As mentioned above, the relatively concentrated phosphoric acid (42% $P_2O_5$) produced in the first stage is transferred via line 14A to the second evaporator 10B and exits this evaporator via line 14B as approximately 54% $P_2O_5$ acid. Of course, the concentration of the final product will vary depending upon the wishes of the operator. Phosphoric acid having a final concentration of 70% $P_2O_5$ or higher can be produced. In the second stage, scrubber liquor containing dissolved fluorine compounds exits tower 17B via line 19B and enters seal box 20B. The liquor in seal box 20B is recycled back through scrubber tower 17B by means of pump 22B. Provision is made for adding make-up water at 23B or at other suitable location to replace volume of liquor withdrawn and to maintain a fluorine compound product of the desired concentration.

The scrubbing liquor in seal box 20B is also transferred to the first-stage seal box via line 30. In general, best recovery is obtained when the concentration of fluorine compounds in the scrubber liquor in seal box 20B is about one-half to slightly below the concentration found in box 20A. For example, when the first-stage scrubber liquor contains about 25–30% fluosilicic acid, the second-stage scrubber liquor should contain around 12–15% fluosilicic acid, but may range up to slightly below 25%.

Since the scrubber liquor in the second stage contains less $SiF_4$ and more HF, it is possible, by mixing the second-stage product into the first-stage product, for one to obtain a clear product with no silica precipitation in either stage. It should be noted, however, that the flow of fluosilicic acid has to be the reverse of the flow of phosphoric acid to prevent silica precipitation in the recycle boxes. If, on the drawing, the fresh water was fed to recycle box 20A and overflowed to recycle box 20B, and then sent to storage, the product (fluosilicic acid) would be clear. However, the fluosilicic acid recycling from box 20A through tower 17A would precipitate silica and eventually plug the nozzles and lines. The silica which precipitates out in box 20A would redissolve as it overflowed into box 20B and, therefore, the final product would have no precipitated silica.

In operation, the dilute phosphoric acid solution containing about 24–33% $P_2O_5$ is continuously introduced into the first evaporating vessel through the acid inlet and phosphoric acid containing about 35–48% $P_2O_5$, usually about 42–45% $P_2O_5$, is continuously withdrawn and transferred to the second evaporating vessel. Phosphoric acid having a concentration of between about 50–75% $P_2O_5$ (usually between 51–58% $P_2O_5$ and frequently about 54% $P_2O_5$) is continuously withdrawn from the second evaporating vessel and sent to storage. In both the first and second stages, steam is passed through a heat exchanger to keep the phosphoric acid at the boiling point. The first-stage evaporator is normally operated at about 3–5 inches absolute mercury. In the second-stage evaporator, the system is operated at about 1–2 inches absolute mercury.

The vapors entering both towers are thoroughly washed by the scrubbing liquor emanating from the spray nozzles. The temperature of the liquor is controlled in part by the amount and temperature of the make-up water which is added at the B recycle box. Another factor affecting the temperature of the recycle liquor is the amount of vacuum applied in the scrubbers. While the temperature of the scrubbing liquor may be slightly above or below the temperature of the vapors to be scrubbed, it is preferred to have the temperature substantially that of said vapors. The scrubbing liquor in both towers is allowed to fall downwardly into the respective barometric legs, while the vapors pass upwardly in the towers. Such a system permits a gas-liquid contact phase which is primarily countercurrent in nature.

The vapors evolved from the evaporating vessels are scrubbed with a liquid which is capable of absorbing volatile fluorine compounds. Specific examples include warm aqueous hydrogen fluoride, and warm aqueous fluosilicic acid containing dissolved HF. It is preferred to use a scrubbing liquor which is capable of absorbing HF and $SiF_4$ so as to form a fluosilicic acid solution. At this point, it should be mentioned that such formation of fluosilicic acid might be transitory or as an intermediate product. For example, if an alkaline solution or an organic absorbing medium is used, obviously the fluosilicic acid might not be formed or, if formed, would be formed into other soluble compounds of which the fluosilicic acid is a constituent. Thus, if aqueous ammonia is used as the absorbing liquid, ammonium silicofluoride would be formed. In addition, it should be noted that, in such a system, the exact form of fluorine compounds in so-called fluosilicic acids is uncertain. It is believed that the nature of the compound varies in solution according to the strength and ratio of fluorine to silica in the liquor. Theoretically, $Si_2F_6$, $SiF_4$, $SiO_2$, HF, $H_2SiF_6$, $H_2Si_2O_4$, $Si(OH)_4$, etc., may be present in what may be called a fluosilicic acid solution (cf. Fluorine Chemistry, by J. H. Simons, vol. 1, 1950, pp. 127–133).

The concentration of dissolved fluorine compounds in the scrubbing liquor may vary. Usually, however, when using aqueous fluosilicic acid as the scrubbing medium, the concentration should not exceed about 42%. Above this concentration, the vapor pressure of the fluorine compounds becomes so great that very little, if any, fluorine compounds are absorbed in the liquor. Obviously, the solubility of HF and $SiF_4$ in various absorbing media will vary and, accordingly, applicant does not intend to be bound to a specific upper limit in regard to the concentration of the scrubbing liquor. However, it is emphasized at this point that the instant process is applicable to the production of high concentrations (30–40%) of fluosilicic acid. Generally, the fluorine removing efficiency is diminished when the strength of the scrubbing liquor is greater than about 25–28%; however, the overall recovery of fluorine is increased in staged evaporation when two or more scrubbers are used in each stage. It is usually desirable to have a concentration of fluosilicic acid of at least 5%, and preferably 13–28%, in the scrubbing liquor. A concentration of less than about 5% fluosilicic acid is impractical, if the recovery of a commercially salable product is desired. However, such dilute solutions are entirely satisfactory, if only removal of the fluorine to prevent atmospheric air pollution is contemplated.

The following examples are presented to illustrate the invention. It will be understood that the specific embodiments and illustrations should not be taken in any manner as limiting the invention as defined in the appended claims.

*Example I*

Phosphoric acid (25.74% $P_2O_5$ and 2.36% fluorine) was continuously introduced into a first evaporator operating at 3.8–4.9 inches absolute mercury and at a temperature of between 73–81° C. The vapors from the evaporator entering the first-stage scrubbing tower contained .83% F. and were scrubbed with an aqueous fluosilicic acid solution having a concentration of about 17.95%. The vapors exiting the first scrubbing tower and entering the barometric condenser contained about .10% F. Simultaneously, the 25.74% $P_2O_5$ acid was concentrated to about 35.27% $P_2O_5$ and fed to the second evaporator which was operated at 1.3–1.6 inches absolute mercury and at a temperature of about 79–82° C. The phosphoric acid was concentrated to 53.78% $P_2O_5$ acid in the second-stage evaporator and was continuously removed from the system. In the second-stage operation, the vapors entering the scrubbing tower contained about 4.78% fluorine and exited the tower containing about 0.20% fluorine. These vapors were selectively scrubbed with an aqueous fluosilicic acid solution having a concentration of about 9%. This 9% fluosilicic acid solution was also transferred to the first-stage seal box. No precipitation of silica was encountered in either seal box. A product (17.95% $H_2SiF_6$) was continuously withdrawn from the first-stage seal box and the over-all efficiency of fluorine recovery, as fluosilicic acid, was 94.45%.

*Example II*

Phosphoric acid (33.09% $P_2O_5$ and 2.21% fluorine) was continuously introduced into a first evaporator operating at 4.4 inches absolute mercury and at a temperature of about 70° C. The vapors from the evaporator entering the first-stage scrubbing tower contained 1.84% fluorine and were scrubbed with an aqueous fluosilicic acid solution having a concentration of about 33.2%. The vapors exiting the first scrubbing tower and entering the barometric condenser contained about .98% fluorine. Simultaneously, the 33.09% $P_2O_5$ acid was concentrated to about 42.74% $P_2O_5$ and fed to the second evaporator which was operated at 2.4 inches of absolute mercury and at a temperature of about 83.5° C. The phosphoric acid was concentrated to 54.91% $P_2O_5$ in the second-stage evaporator and was continuously removed from the system. In the second-stage operation, the vapors entering the scrubbing tower contained about 5.49% fluorine and exited the tower containing about 1.05% fluorine. These vapors were selectively scrubbed with an aqueous fluosilicic acid solution having a concentration of about 16%. This 16% fluosilicic acid was also transferred to the first stage seal box. No precipitation of silica was encountered in either seal box. A product (33.20% $H_2SiF_6$) was continuously withdrawn from the first-stage seal box. The over-all efficiency of fluorine recovery, as fluosilicic acid, was 68% when only one scrubber was used in each stage; but the fluorine recovery may be increased to the 90–95% range by using two or more scrubbers in each stage.

The above examples clearly show that transfer of the scrubbing liquor from the second-stage to the first-stage seal box in multiple-stage evaporation of phosphoric acid will prevent precipitation of silica.

Although fluosilicic acid of a specific concentration was employed to illustrate the invention, it should be understood that any liquid-absorbing medium enriched in hydrogen fluoride which is capable of selectively absorbing vaporous fluorine compounds in preference to water vapor is also suitable for use in the instant process. Furthermore, the invention is not to be limited to any specific concentration of scrubbing liquor or product produced.

Obviously, many modifications and variations of the invention as hereinbefore set forth may be made without departing from the spirit and scope thereof and, accordingly, only such limitations should be imposed as are indicated in the appended claims.

I claim:

1. In the multi-stage method for concentrating "wet-process" phosphoric acid wherein said acid is concentrated under vacuum in a primary concentrator to produce vapors containing water vapor and fluorine compounds mainly in the form of HF and $SiF_4$, wherein said vapors are contacted with a primary fluorine-compound-absorbing liquor to absorb said compounds in said primary liquor, and wherein said acid is transferred to a secondary concentrator, an improvement for avoiding precipitation of silica during recovery of fluorine compounds from said vapors, said improvement comprising the steps of: adding HF to said primary fluorine-compound-absorbing liquor in quantities sufficient to provide an excess of HF in said primary liquor after absorption of said vapors whereby precipitation of silica is avoided; further concentrating said acid under vacuum in said secondary concentrator to produce additional vapors containing a stoichiometric excess of HF over $SiF_4$; contacting said additional vapors with a secondary fluorine-compound-absorbing liquid whereby an excess of HF is absorbed by said secondary liquor; and transferring a portion of said secondary liquor to said primary liquor to serve as a source of HF for said primary liquor.

2. The process of claim 1 wherein the primary and secondary liquors are aqueous solutions of fluosilicic acid at an elevated temperature substantially that of said vapor and additional vapor, respectively.

3. The process of claim 1 wherein the phosphoric acid in concentrated to a $P_2O_5$ content of less than about 50% in the primary concentrator and to a $P_2O_5$ content of from 50–75% in the secondary concentrator.

4. In the multi-stage method for concentrating "wet-process" phosphoric acid wherein said acid is concentrated under vacuum in a primary concentrator to produce vapors containing water vapor and fluorine compounds mainly in the form of HF and $SiF_4$, wherein said vapors are contacted with a primary fluorine-compound-absorbing liquor to absorb said compounds in said primary liquor, and wherein said acid is transferred to a secondary concentrator, an improvement for avoiding precipitation of silica during recovery of fluorine compounds from said vapors, said improvement comprising the steps of: collecting said primary liquor after scrubbing and recycling a portion of said liquor to said primary scrubbing zone; adding HF to said primary liquor in quantities sufficient to provide an excess of HF in said primary liquor after absorption of said vapors whereby precipitation of silica is avoided; further concentrating said acid under vacuum in said secondary concentrator to produce additional vapors containing a stoichiometric excess of HF over $SiF_4$; contacting said additional vapors with a secondary fluorine-compound-absorbing liquor whereby an excess of HF is absorbed by said secondary liquor; transferring a portion of said secondary liquor to said primary liquor to serve as a source of HF for said primary liquor, and withdrawing from the system a portion of said primary liquor as a fluorine-containing product.

5. The process of claim 4 wherein the primary and secondary liquors are aqueous solutions of fluosilicic acid at an elevated temperature substantially that of said vapor and additional vapor, respectively.

6. The process of claim 5 wherein the portion of secondary liquor transferred to said primary liquor contains an excess of HF sufficient to provide at least a 2 to 1 mole ratio of HF to $SiF_4$ in said primary liquor after absorption of vapors produced in said primary concentrator.

7. The process of claim 5 wherein the concentration of fluosilicic acid in said second liquor is from 5 to below about 25% and the concentration of fluosilicic acid in said primary liquor is below 42% and makeup water is added to said second liquor.

References Cited by the Examiner

UNITED STATES PATENTS 1,851,652    5/1932    Soll et al. _____ 23—153
3,091,513    5/1963    Parish _____ 23—88 X

FOREIGN PATENTS 448,662    5/1948    Canada.

OSCAR R. VERTIZ, *Primary Examiner.*

MAURICE A. BRINDISI, MILTON WEISSMAN,
*Examiners.*

E. STERN, *Assistant Examiner.*